United States Patent
Shankar

(10) Patent No.: US 7,477,612 B2
(45) Date of Patent: Jan. 13, 2009

(54) TOPOLOGY DISCOVERY PROCESS AND MECHANISM FOR A NETWORK OF MANAGED DEVICES

(75) Inventor: Laxman Shankar, San Jose, CA (US)

(73) Assignee: Broadcom Corporation, Irvine, CA (US)

( * ) Notice: Subject to any disclaimer, the term of this patent is extended or adjusted under 35 U.S.C. 154(b) by 1200 days.

(21) Appl. No.: 10/351,517

(22) Filed: Jan. 27, 2003

(65) Prior Publication Data

US 2003/0174709 A1  Sep. 18, 2003

Related U.S. Application Data

(60) Provisional application No. 60/364,042, filed on Mar. 15, 2002, provisional application No. 60/417,645, filed on Oct. 11, 2002.

(51) Int. Cl.
*H04L 12/28* (2006.01)
*H04B 1/44* (2006.01)

(52) U.S. Cl. .................. 370/254; 370/395.31; 370/396; 370/282

(58) Field of Classification Search ................ 370/252, 370/400, 389, 254, 390, 395.21, 256, 257, 370/258, 250, 395.3, 276, 282, 392, 396, 370/395.31; 709/238, 242, 220, 221, 222
See application file for complete search history.

(56) References Cited

U.S. PATENT DOCUMENTS

| | | | |
|---|---|---|---|
| 5,280,480 A | 1/1994 | Pitt et al. | |
| 5,729,685 A * | 3/1998 | Chatwani et al. | 709/224 |
| 5,825,772 A | 10/1998 | Dobbins et al. | |
| 5,845,081 A | 12/1998 | Rangarajan et al. | |
| 6,259,699 B1 | 7/2001 | Opalka et al. | |
| 6,873,602 B1 * | 3/2005 | Ambe | 370/254 |
| 7,054,951 B1 * | 5/2006 | Kao et al. | 709/242 |
| 7,120,127 B2 * | 10/2006 | Fieremans | 370/254 |
| 7,171,476 B2 * | 1/2007 | Maeda et al. | 709/227 |
| 7,251,222 B2 * | 7/2007 | Chen et al. | 370/256 |

FOREIGN PATENT DOCUMENTS

| | | |
|---|---|---|
| WO | 95/01030 | 1/1995 |
| WO | 99/00945 | 1/1999 |

* cited by examiner

*Primary Examiner*—Hanh Nguyen
(74) *Attorney, Agent, or Firm*—Squire, Sanders & Dempsey, LLP

(57) ABSTRACT

A process of discovering a topology of devices on a network is disclosed. A discover frame is sent to nodes in communication with a central processing unit, with the discover frame having an identification list. After a response frame from the nodes is received, the response frame is processed to determine whether a node sending the response frame has an identification value. If the node has the identification value, then a routing table is updated. When the node does not have the identification value, an identification assign frame is sent to the node and an identification assign acknowledgement frame is received from the node.

33 Claims, 3 Drawing Sheets

TOPOLOGY DISCOVERY PROCESS AND MECHANISM FOR A NETWORK OF MANAGED DEVICES

REFERENCE TO RELATED APPLICATIONS

This application claims priority of U.S. Provisional Patent Application Ser. No. 60/364,042, filed on Mar. 15, 2002, and U.S. Provisional Patent Application Ser. No. 60/417,645, filed on Oct. 11, 2002. The contents of the provisional applications are hereby incorporated by reference.

BACKGROUND OF THE INVENTION

1. Field of Invention

The present invention relates to network devices that allow for data to be routed and moved in computing networks. More specifically, the present invention provides for an improved method of discovering the topology of managed devices in a network and setting the routing required to communicate data between the managed devices.

2. Description of Related Art

As computer performance has increased in recent years, the demands on computer networks has significantly increased; faster computer processors and higher memory capabilities need networks with high bandwidth capabilities to enable high speed transfer of significant amounts of data. The well-known Ethernet technology, which is based upon numerous IEEE Ethernet standards, is one example of computer networking technology which has been able to be modified and improved to remain a viable computing technology. A more complete discussion of prior art networking systems can be found, for example, in SWITCHED AND FAST ETHERNET, by Breyer and Riley (Ziff-Davis, 1996), and numerous IEEE publications relating to IEEE 802 standards. Based upon the Open Systems Interconnect (OSI) 7-layer reference model, network capabilities have grown through the development of repeaters, bridges, routers, and, more recently, "switches", which operate with various types of communication media.

When multiple devices are employed in a network, the management of those devices is important to the overall functioning of the network. Often, management and control planes are implemented using propriety system buses or standards based buses, like, for example, PCI. Such an implementation can, however, be expensive and can be problematic if there is a single point of failure or if the designs for hot swappable devices are complex.

In-band management alleviates all the above and provides for resilient control of a network of managed devices. When using in-band management, the network management traffic flows through the network being managed along with the data that is be processed and routed. In-band management of a set of switching device connected together is one requirement in network devices in use today. There are significant cost savings and simplicity of design achieved due to in-band management. In typical switching system, the topology of the devices can change dynamically due to a multiple of reasons.

If a static topology configuration is used, the system will need user/administrator intervention to reconfigure the system each time there is a new topology created. There are multiple reasons for which a new topology may be created.

As such, there is a need for a method or mechanism that can be used by an master device in the network to automatically learn the topology of a set of devices arbitrarily connected using bi-directional point to point links. There is also a need for a mechanism to detect device failure and potentially re-route control plane traffic over alternate routes.

SUMMARY OF THE INVENTION

It is an object of this invention to overcome the drawbacks of the above-described conventional network devices and methods. A topology discovery process and mechanism are described which allow multiple System Management Central Processing Units (SCPUs) to learn the topology of the network of devices and set up forwarding paths to every device in the system. Each SCPU can learn about the existence of the other SCPUs in the system and participate in a master election process. The master SCPU will then control the system. A standby SCPU will learn the topology independently using this technique and be ready to take over the control plane of the system in the event of the Master SCPU fails for any reason. If the topology changes, the all of the SCPUs will re-learn the new topology using the method described in this disclosure. In case of a device failure, in control of the system will potentially re-route control plane traffic over alternate routes.

According to one aspect of this invention, a process of discovering a topology of devices on a network is disclosed. A discover frame is sent to nodes in communication with a central processing unit, with the discover frame having an identification list. After a response frame from the nodes is received, the response frame is processed to determine whether a node sending the response frame has an identification value. If the node has the identification value, then a routing table is updated. When the node does not have the identification value, an identification assign frame is sent to the node and an identification assign acknowledgement frame is received from the node.

Alternatively, the central processing unit may be a system management central processing unit having a source device identifier and the discover frame may be sent having the source device identifier included therein. Also, the discover frame may include a field, referred to as a number of hops field, which indicates the number of nodes that the discover frame has passed through. In addition, a discovery timer may be set when the discover frame is sent and the process may be stopped when the discovery timer reaches a predetermined value. Also, the process may include reviewing an explosion factor contained in the response frame, where the explosion factor is related to a number of ports on the node that have not received a separate discover message. In addition, the predetermined value of the discovery timer may be changed based on the explosion factor.

According to another aspect of this invention, a process of discovering a topology of devices on a network is also disclosed. A discover frame is received having an identification list from a node from a central processing unit and is checked to see whether an identification value is set. A response to the central processing unit is sent and the discover frame is sent to all ports of the node that have not received a separate discovery frame when the identification value is not set.

In other embodiments, the process may also include comparing the identification value with frame identification values in the discovery frame and dropping the discovery frame when the identification value matches one of the frame identification values in the discovery frame. In addition, a routing table may be updated with route information from the discover frame when the identification value is set. This updating of the routing table can include adding the route information to information in the routing table, sorting all entries of the routing table according to number of nodes that are passed through to reach a destination, and setting as an active route an entry of the routing table having a smallest number of nodes that are passed through for the destination. Additionally, when the identification value is set, an identification assign frame is received from the central processing unit and an identification assign acknowledgement frame is sent to the central processing unit. The discover frame is forwarded to all ports of the node that have not received a separate discovery frame and a routing table is updated with route information from the discover frame.

These and other objects of the present invention will be described in or be apparent from the following description of the preferred embodiments.

BRIEF DESCRIPTION OF THE DRAWINGS

For the present invention to be easily understood and readily practiced, preferred embodiments will now be described, for purposes of illustration and not limitation, in conjunction with the following figures.

DETAILED DESCRIPTION OF PREFERRED EMBODIMENTS

The present invention is directed to a topology discovery process and mechanism, described below, which allow multiple System Management Central Processing Units (SCPUs) to learn the topology to each device and set up forwarding paths to every device in the system. Each SCPU can learn about the existence of the other SCPUs in the system. If the topology changes, the SCPU will re-learn the new topology using the method described in this disclosure. In case of a device failure, in control of the system will potentially re-route control plane traffic over alternate routes.

Figure 1:
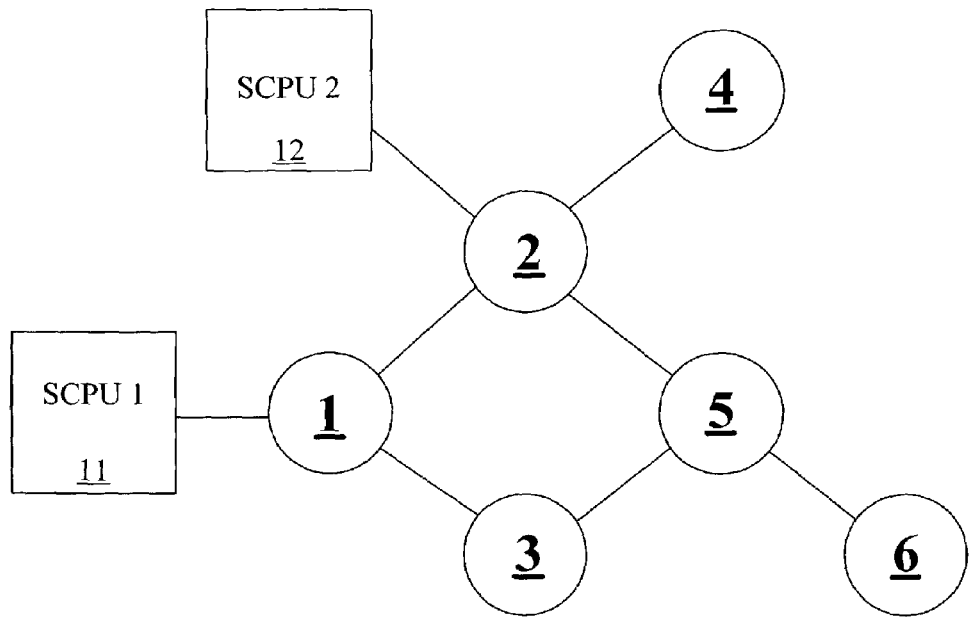
FIG. 1 is an example of the topography that can be present between processors and nodes in a network, according to one embodiment of the present invention.

An example of a topology of devices in a network is illustrated in FIG. 1. Each link shown is a point-to-point bi-directional link which is the data path between a pair of devices. SCPU1 11 and SCPU2 12 independently perform topology discovery. The bi-directional links connect the SCPUs to nodes, numbered 1-6. The "outer" nodes of the network, nodes 4 and 6 in FIG. 1, are generally referred to as "leaves" since they do not further connections other than the connections that tie them to the network. When all of the leaf nodes have been discovered, most of the topology of the network has been discovered.

As a result of the topology discovery process, each SCPU learns all the routes to each device in the system and all the routes to the other SCPU in the system. As a result of the topology discovery process, each device learns all routes to each SCPU in the system and the Master SCPU in the system.

Figure 2:
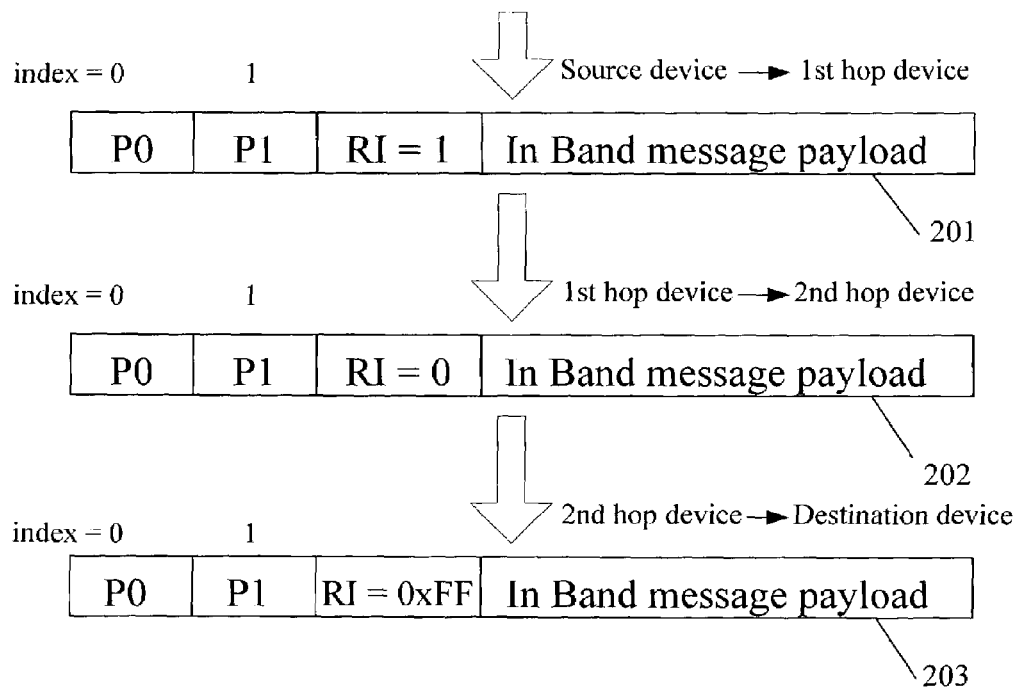
FIG. 2 is diagram illustrating the forwarding mechanism according to one aspect of the present invention.

The forwarding mechanism will now be discussed. The entire route to the destination is carried in the packet header. This route is an output port list. Each device strips off the first port of the header as the packet travels through the network. However, a "route index" also can be carried in the packet header which points to the output port which each device looks at and forwards the packet after decrementing the route index. The forwarding process is also illustrated in FIG. 2. In the figure, P0 and P1 are output port lists and RI is the route index. As shown, the packet carries a route index that points to the output port which every device looks at.

There is a special value assigned to the route index when the packet is forwarded by the penultimate device to the destination device. When a device finds the route index to match the reserved route index value, it absorbs the packet for processing.

In order to confirm that the packet is destined to a specific device, the device can compare the destination device ID in the packet header with its own device ID. The advantages of this process are that there is no table maintained by any device and there is no lookup of the destination address as the port on which the packet has to be forwarded directly obtained from the packet header. This process does, however, increase the header size with the increase in the number of devices in the path. Hence there is a scalability problem. There is a limit to the number of bits in the route index.

In general, the messages sent between the node devices and the SCPU devices in the network need to have a format common to all of the devices so that control data can be exchanged. Examples of these frames are provided below, but it should be noted that the examples of frame formats are not the only implementations of the messages exchanged. The discover frame format, according to one embodiment, is illustrated in TABLE 1:

TABLE 1

| Field Name | Width |
| --- | --- |
| Type = DISCOVER | 8-bits |
| Source Device ID | 8-bits |
| Number of Hops [num_hops] | 8-bits |
| Route_to_CPU [num_hops] | 8-bit array |
| ID_List [num_hops] | 8-bit array |
| Route_from_CPU [num_hops] | 8-bit array |

The format for the response frame, according to one embodiment, is given in TABLE 2:

TABLE 2

| Field Name | Width |
| --- | --- |
| Type = RESPONSE | 8-bits |
| Source Device ID | 8-bits |
| ID exists | 8-bits |
| Explosion Factor | 8-bits |
| Destination (CPU) Device ID | 8-bits |
| Route Index | 8-bits |
| Number of Hops [num_hops] | 8-bits |
| Route_to_CPU [num_hops] | 8-bit array |
| ID_List [num_hops] | 8-bit array |
| Route_from_CPU [num_hops] | 8-bit array |

The format for the Identification Assign (ID Assign) frame, according to one embodiment, is given in TABLE 3:

TABLE 3

| Field Name | Width |
| --- | --- |
| Type = ID_ASSIGN | 8-bits |
| Source (CPU) Device ID | 8-bits |
| Destination Device ID | 8-bits |
| Number of Hops [num_hops] | 8-bits |
| Route Index | 8-bits |
| Route_to_device [num_hops] | 8-bit array |

The format for the Identification Assign Acknowledgement (ID Assign Ack) frame, according to one embodiment, is given in TABLE 4:

TABLE 4

| Field Name | Width |
| --- | --- |
| Type = ID_ACK | 8-bits |
| Source Device ID | 8-bits |
| Destination (CPU) Device ID | 8-bits |
| Number of Hops [num_hops] | 8-bits |
| Route Index | 8-bits |
| Route_to_CPU [num_hops] | 8-bit array |

Figure 3:
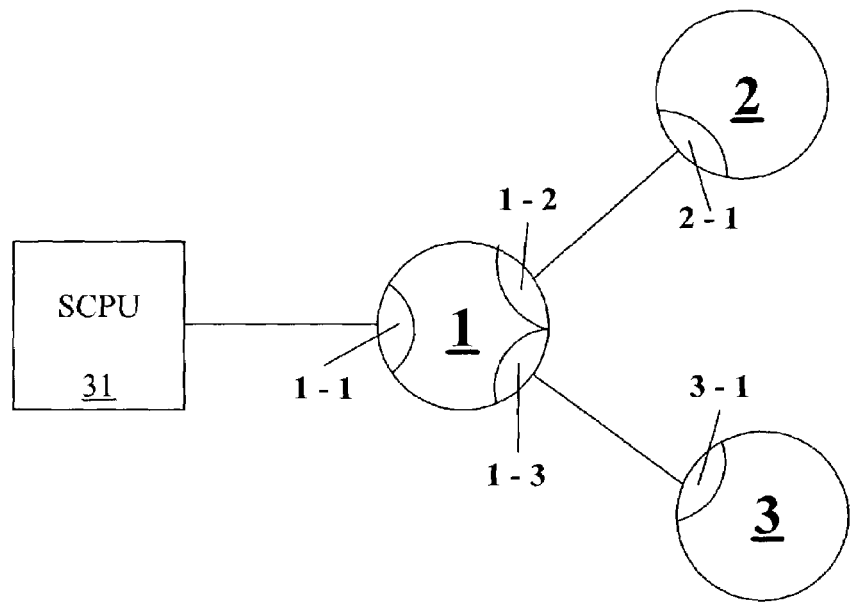
FIG. 3 is simple example of the topography of a network showing the in band nodes connecting the network elements together, according to one embodiment of the invention.

The process and mechanism of topology discovery is discussed for a simple topology example provided in FIG. 3, according to one embodiment of the present invention. In FIG. 3, the topology of the simple example has a single SCPU 31 connected to node 1, with node 1 connected to nodes 2 and 3. Specifically, the SCPU 31 is connected to node 1 at port 1-1 of node 1. Ports 1-2 and 1-3, of node 1, connect to nodes 2 and 3, respectively, at ports 2-1 and 3-1, respectively.

The SCPU 31 sends a discover frame to node device 1. The SCPU starts a discovery timer. The topology discovery process is stopped when this timer expires. The other possible terminating option is to count the number of leaves in the network of devices. The discovery frame for this example is illustrated in TABLE 5:

TABLE 5

| Field Name | Width | Value |
| --- | --- | --- |
| Type | 8-bits | DISCOVER |
| Source Device ID | 8-bits | SCPU ID |
| Number of Hops [num_hops] | 8-bits | 0 |
| Route_to_CPU [num_hops] | 8-bit array | NULL |
| ID_List [num_hops] | 8-bit array | NULL |
| Route_from_CPU [num_hops] | 8-bit array | NULL |

If the SCPU discovery timer times out without receiving any response, it flags an error to the higher layer management software entities. Node device 1 checks if it already knows its ID. The ID on reset will be a reserved ID for all devices which will not be assigned by any SCPU. If Device 1 knows its ID, it checks to see if its ID exists in the discover frame. If it exists, the discover frame is dropped and no further processing takes place. This is because the discover frame came back due to a loop in the network.

If the ID does not exist in the discover frame, node device 1 sends a response to SCPU setting the ID exists bit in the response frame and fills in the source device ID field in the response from with its ID. It fills in the number of in-band capable ports on which it has not yet heard a discover in the explosion factor field of the response frame. The device 1 learns the new route to the SCPU which sent the discover frame. The existing route to the SCPU is compared with the new route and the better one is chosen as the active route. The device learns up to a predetermined number of routes to a SCPU. The device 1 forwards the discover frame to all in-band capable ports in the device on which it has not yet heard a discover. It adds its own ID to the ID list in the discover frame. It updates the route to CPU field and the route from CPU and the number of hops fields in the discover frame. The route from CPU is different for each output port on which the discover frame is transmitted. The response frame for this example is provided in TABLE 6:

TABLE 6

| Field Name | Width | Value |
| --- | --- | --- |
| Type | 8-bits | RESPONSE |
| Source Device ID | 8-bits | Device ID |
| ID exists | 8-bits | 1 |
| Explosion Factor | 8-bits | 2 |
| Destination (CPU) Device ID | 8-bits | SCPU ID |
| Route Index | 8-bits | 0xFF |
| Number of Hops [num_hops] | 8-bits | NULL |
| Route_to_CPU [num_hops] | 8-bit array | NULL |
| ID_List [num_hops] | 8-bit array | NULL |
| Route_from_CPU [num_hops] | 8-bit array | NULL |

If the node device 1 does not know it ID yet, it sends a response to the SCPU with the ID exists field set to 0. It also fills in the explosion factor in the response frame. The explosion factor is the number of in-band ports in the device on which it has not yet heard a discover. It then waits for an ID Assign message from the CPU. The response frame for this example is provided in TABLE 7:

TABLE 7

| Field Name | Width | Value |
| --- | --- | --- |
| Type | 8-bits | RESPONSE |
| Source Device ID | 8-bits | NULL |
| ID exists | 8-bits | 0 |
| Explosion Factor | 8-bits | 2 |
| Destination (CPU) Device ID | 8-bits | SCPU ID |
| Route Index | 8-bits | 0xFF |
| Number of Hops [num_hops] | 8-bits | NULL |
| Route_to_CPU [num_hops] | 8-bit array | NULL |
| ID_List [num_hops] | 8-bit array | NULL |
| Route_from_CPU [num_hops] | 8-bit array | NULL |

The SCPU receives the response and updates the route to the device. If a route already exists, in this example the SCPU adds the new route to the device sorting the routes in increasing order of the number of hops. The SCPU adds time to the discovery timer based on the explosion factor which is the number of in-band capable ports on which a discover has not yet been received, in the response frame. If the ID exists field is 1, the SCPU adds time as soon as it receives the response. If the ID exists field is 0, the SCPU adds time after it receives the ID Assign acknowledgement message. The time added to the discovery timer is also proportional to the number of hops to the device and the link speed. Alternatively, it counts the number of leaves learned so far. If the explosion factor field in the response frame equals 0, the device is a leaf.

The SCPU sends an ID Assign message if it finds that the device has the ID exists field set to 0. The SCPU starts an ID Assign acknowledgement receive timer. If it does not receive an ID Assign Ack before the timer expires, it retransmits the ID Assign message up to a maximum number of times before flagging an error condition to a higher layer management software entities. The ID Assign frame for this example is given in TABLE 8:

TABLE 8

| Field Name | Width | Value |
|---|---|---|
| Type | 8-bits | ID_ASSIGN |
| Source (CPU) Device ID | 8-bits | SCPU ID |
| Destination Device ID | 8-bits | 1 |
| Number of Hops [num_hops] | 8-bits | 0 |
| Route Index | 8-bits | 0xFF |
| Route_to_device [num_hops] | 8-bit array | NULL |

Device 1 receives the ID Assign message, updates its ID, and replies to the SCPU with an ID Assign Ack message. Device 1 also forwards the discover frame on all in-band capable ports on which it has not yet received a discover, in this example to node devices 2 and 3. Device 1 also adds its ID to the ID list and updates route from CPU, route to CPU and number of hops in the discover frame. The Device 1 also learns the route to the SCPU. The ID Assign Ack frame for this example is given in TABLE 9 and the forwarded discovery frames for this example are given in TABLES 10 and 11 for nodes 2 and 3, respectively:

TABLE 9

| Field Name | Width | Value |
|---|---|---|
| Type | 8-bits | ID_ACK |
| Source Device ID | 8-bits | 1 |
| Destination (CPU) Device ID | 8-bits | SCPU ID |
| Number of Hops [num_hops] | 8-bits | 0 |
| Route Index | 8-bits | 0xFF |
| Route_to_CPU [num_hops] | 8-bit array | NULL |

TABLE 10

| Field Name | Width | Value |
|---|---|---|
| Type | 8-bits | DISCOVER |
| Source Device ID | 8-bits | SCPU ID |
| Number of Hops [num_hops] | 8-bits | 1 |
| Route_to_CPU [num_hops] | 8-bit array | 1 |
| ID_List [num_hops] | 8-bit array | 1 |
| Route_from_CPU [num_hops] | 8-bit array | 2 |

TABLE 11

| Field Name | Width | Value |
|---|---|---|
| Type | 8-bits | DISCOVER |
| Source Device ID | 8-bits | SCPU ID |
| Number of Hops [num_hops] | 8-bits | 1 |
| Route_to_CPU [num_hops] | 8-bit array | 1 |
| ID_List [num_hops] | 8-bit array | 1 |
| Route_from_CPU [num_hops] | 8-bit array | 3 |

The node devices 2 and 3 each receive a discover frame and devices 2 and 3 perform all actions performed by device 1 described above. In addition, the SCPU 31 builds a routing table as follows in TABLE 12:

TABLE 12

SCPU routing table

| # | Device | Number of Hops | Route (output port list) |
|---|---|---|---|
| 1 | 1 | 0 | 1 |
| 2 | 2 | 1 | 1, 2 |
| 3 | 3 | 1 | 1, 3 |

An example of the discovery process of the present invention to a complex topology is provided with respect to FIG. 1. The presence of two SCPUs and a loop in the network of devices allows this topology to address most possible cases that may arise in the topology discovery process.

SCPU1 11 sends a discover frame to the network devices and the process unfolds as described in the previous example. SCPU2 12 sends out a discover frame to node 2 and independently learns the device topology. Each device stores a separate data structure for each SCPU in the system.

When SCPU2 12 discovers SCPU1 11, they exchange relevant information to perform the master election. Each SCPU continues and completes its topology discovery process even if the master election is complete. The master SCPU starts system configuration. Sufficient time outs can ensure that one of the SCPUs does not start with system configuration assuming that it is the master.

The specific topology discovery events in node 5 will now be discussed in greater detail. Node 5 receives discover frames from both 2 and 3. Assume that the discover frame from SCPU1 11 came from node 3 but node 2 has not sent a discover frame yet. Then node 5 sends a response to SCPU1 11 via nodes 3 and 1. SCPU1 11 sends an ID Assign to node 5 via nodes 1 and 3. Node 5 sends an ID Assign Ack to SCPU1 11 via nodes 3 and 1. Node 5 sends discover frames to nodes 2 and 6. Node 2 sends a response to SCPU1 11 via nodes 5, 3 and 1.

SCPU1 11 then sends an ID Assign to 2 via nodes 1, 3 and 5. Node 2 sends an ID Assign Ack to SCPU1 11 via nodes 5, 3 and 1. Node 2 then sends discover frames to node 1 and 4. Node 1 rejects the frame since 1 is in the ID list. Node 4 sends a response via nodes 2, 5, 3 and 1. SCPU1 11 sends an ID Assign to node 4 via nodes 1, 3, 5 and 2. Node 4 sends an ID Assign Ack to SCPU1 11 via nodes 2, 5, 3 and 1. If, after this, node 2 sends a discover to nodes 4 and 5, where those discovers were forwarded from node 1, then node 4 sends a response to SCPU1 11 with ID exists equal to 1 and device ID equal to 4 via nodes 2 and 1. Also, node 5 sends a response to SCPU1 11 with ID exists equal to 1 and device ID equal to 5 via nodes 2 and 1. Because of this, SCPU1 11 learns of a second route to node 5, via nodes 1, 2 and 5, and learns of a shorter route to node 4, via nodes 1, 2 and 4.

With respect to data structures and processing, the System Management Central Processing Unit (SCPU) maintains several data structures. These include a CPU device ID, topology discovery completion event structures, statistics counters and a routing table. The topology discovery completion event structure can include the number of leaves of the network, the number of leaves found, a time limit for topology discovery and a timer. The statistics counters can include counters recording the number of discovery frames sent, the number of responses received and the number of discards. In one embodiment of the present invention, the routing table has the following form given in TABLE 13:

TABLE 13

| Destination Device ID | Number of Routes | Route Information |
|---|---|---|
| 1 | 2 | Route #1 Number of Hops, Route (Out port list), ID list (for stats) |
| | | Route #2 Number of Hops, Route (Out port list), ID list (for stats) |
| 2 | 1 | Number of Hops, Route (Out port list), ID list (for stats) |
| . | | |
| . | | |
| . | | |

The process followed by the SCPU would be as follows. First, all data structures are initialized. Then, a discover frame is sent from the SCPU to the network of devices. The topology discovery timer is started. If no response id received before the timer expires, an error is flagged to higher layer management software.

In terms of processing the responses received, the SCPU receives the response and updates the route to the device. If a route already exists, the SCPU adds the new route to the device sorting the routes in increasing order of the number of hops. The SCPU adds time to the discovery timer based on the explosion factor which is the number of in-band capable ports on which the device has not yet received a discover, in the response frame. The number of in-band ports field gives an idea of the number of discovers being generated in the network. If the ID exists field is 1, the SCPU adds time as soon as it receives the response. If the ID exists field is 0, the SCPU adds time after it receives the ID Assign Ack message. The time added to the discovery timer is also proportional to the number of hops to the device and the link speed. Alternatively, it counts the number of leaves learned so far. If the number of in-band ports field in the response frame equals 1, the device is a leaf.

The SCPU sends an ID Assign message if it finds that the device has the ID exists field set to 0. The SCPU starts an ID Assign Ack receive timer. If it does not receive an ID Assign Ack before the timer expires, it retransmits the ID Assign message up to a maximum number of times before flagging an error condition to higher layer management software entities.

Once the ID Assign Ack is received, a master election is performed if the response is from another SCPU. Each SCPU will know the device ID block reserved for SCPUs in the system. The SCPU will be able to identify a response received from another SCPU based on the ID. If a discover frame from another SCPU is received, a response frame is sent. Once all leaf nodes of the network are discovered, the nodes are polled to make sure that all of the nodes are still "alive." If one of the nodes is determined to not be alive, the routing database is updated to remove all routes that contain the "dead" device as a transit device.

The requirements for the device nodes are similar. The data structures required for each node include SCPU node device IDs, whether the node is a leaf node, an in-band ports list, routes to the SCPUs and statistics counters. These counters can includes counters of the number of discovers received, number of responses received, number of commands received, number of discovers sent, number of responses sent, and number of commands sent. In one embodiment of the present invention, the routing table has the following form given in TABLE 14:

TABLE 14

| CPU Device ID | Active CPU | # of Routes | Route Information | | |
|---|---|---|---|---|---|
| 0xFF | * | 2 | Route #1 | Number of Hops, Route, ID list | * (active route) |
| | | | Route #2 | Number of Hops, Route, ID list | |
| 0xFF | * | 2 | Route #1 | Number of Hops, Route, ID list | * |

Initially, a forward_discover_pending flag is set to FALSE and other data structures are initialized. Once frames are received on ports of the node devices, the frame is examined to determine if it is a discover frame. If it is a discover frame, the frame is processed and the ports upon which the discover frames are received are noted so that discovery frames need not be forwarded out on those same ports. The node device checks if an ID has already been assigned to it by the SCPU, and if an ID has already been assigned, then the device checks to see if its ID exists in the discover message. If the ID exists in the discover message, the discover frame is dropped.

If the discover frame is not dropped, the device learns the route to the SCPU. The device also learns up to a maximum number of routes to a particular SCPU. IF a route to the SCPU which sent the discover exists, the cost, i.e. the number of hops, of the current route is compared with the costs of existing routes. The new route is inserted in a sorted descending order in the route list to this SCPU. The route with the lowest cost is used as the active route to the SCPU.

The node device also response by sending a response frame to the port from which the discover message was received. This is a message directed to the SCPU. The message contains the number of in-band capable ports on which a discover has not yet been received filled into the explosion factor field in the response frame.

If the node device already has been assigned an ID, the response message contains the device ID and sets the ID exists bit in the response header to 1. The node also forwards the discover messages to all band capable ports on which a discover has not been received before. If the node device has not already been assigned an ID, the ID exists bit is set to 0 and the node device waits for an ID Assign message from the SCPU.

Alternatively, if the received frame is an ID Assign frame, the node sends an ID Assign Ack to the SCPU. If the frame is a response frame, the response is sent to the next hop as specified in the route in the response frame header and the route index in the header is decremented. If the frame is a command frame, the command is executed and a response is sent to the SCPU. If the frame is an exception condition, an interrupt frame is sent to the SCPU. If the frame is a data frame, the data frame is passed to the SCPU.

Figure 4:
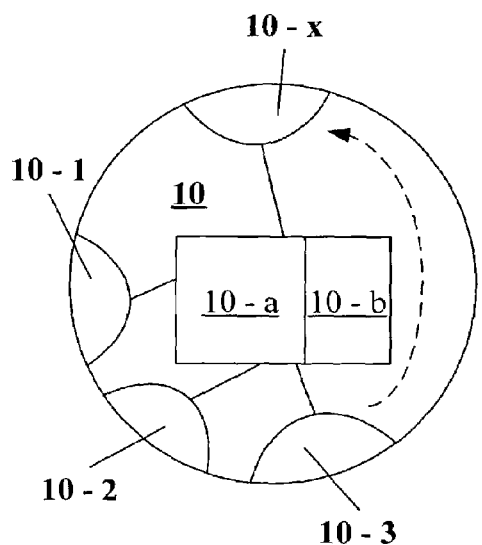
FIG. 4 is a diagram illustrating portions of the node devices, according to one embodiment of the present invention.
Figure 5:
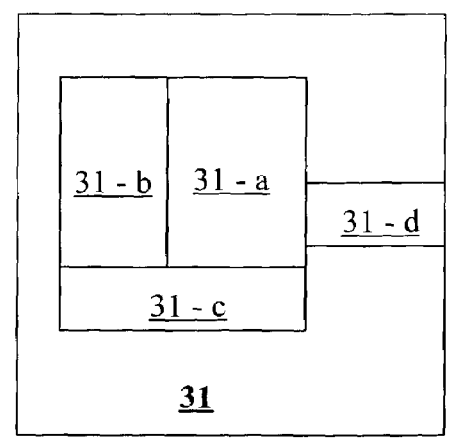
FIG. 5 is a diagram illustrating portions of the System Management Central Processing Unit (SCPU), according to one embodiment of the present invention.

The structures of the nodes devices and SCPUs, according to different embodiments of the present invention, are illustrated in FIGS. 4 and 5. FIG. 4 illustrates portions of the node devices. The node device has a number of ports, ranging from 10-1, 10-2, 10-3, . . . 10-x, for communicating data with the network. Each of those ports are in communication with a processor 10-a, where the processor also is in communication with a memory 10-b. The processor 10-a acts as an interface for the ports and is used to examine frames that are received from the ports. The processor 10-a makes use of the memory 10-b to carry out its processes, including maintaining a routing list in the memory 10-b. The processor 10-a also acts to generate frames necessary to determine the topology of the network.

FIG. 5 illustrates portions of the SCPU 31. The SCPU has a processing core 31-a that examines and processes frames received from device nodes and other SCPUs and generates different types of frames. The processing core 31-a is in communication with a memory 31-b, that is used by the processing core to carry out processes and particularly to store a routing list. The processing core 31-a is also in communication with a timer 31-c and port interface 31-d. The timer 31-c is used in the present invention as a discover timer that can be used to time-out the discovery process if necessary. The port interface 31-d acts as an interface between the processing core 31-a and ports of the SCPU. In the embodiments illustrated in FIGS. 1 and 3, only one port for the SCPUs is illustrated, but the present invention is not so limited.

Figure 6:
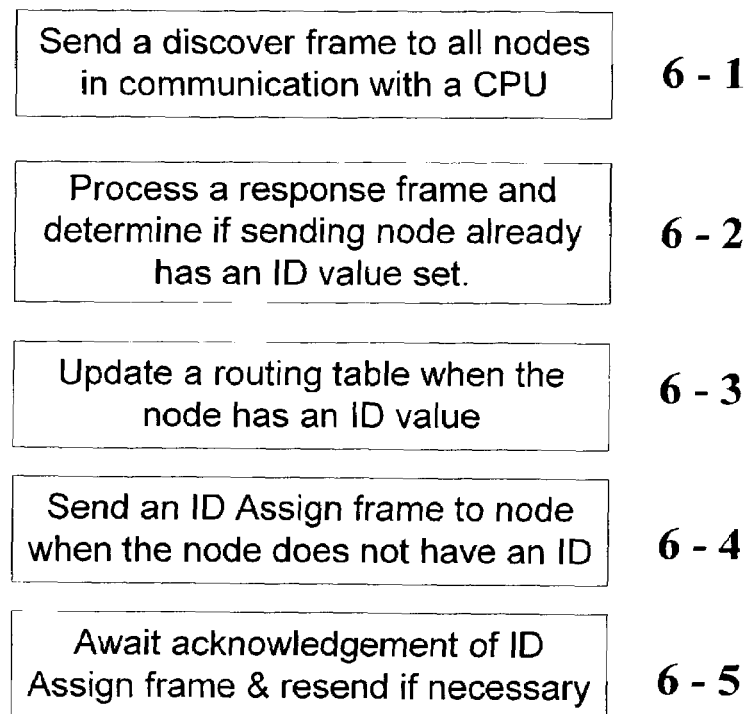
FIG. 6 presents a flow chart for steps carried out by the SCPU to determine the topology of a network of devices.

The process carried out by the SCPU is illustrated in the flowchart contained in FIG. 6. First, a discover frame is sent to all nodes in communication with the CPU of SCPU, in step 6-1. In step 6-2, a response frame is received and processed from one of the nodes and it is determined whether the sending node already has an ID value set. The routing table is updated when the node has an ID value, in step 6-3 and an ID Assign frame is sent to the node device if the node does not have an ID value, in step 6-4. If the ID Assign frame was sent, the SCPU awaits an acknowledgement and resends the ID Assign frame if necessary, in step 6-5.

Figure 7:
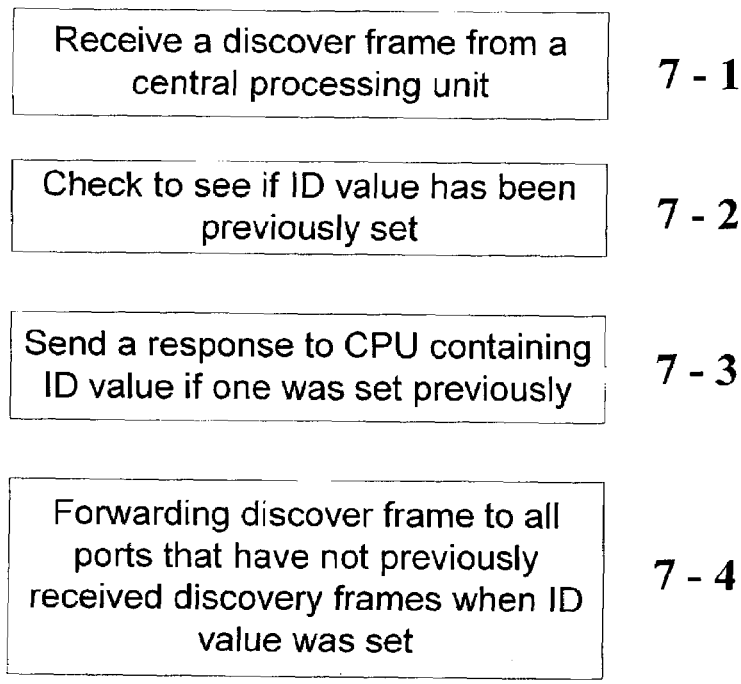
FIG. 7 presents a flow chart for steps carried out by the device nodes to determine the topology of a network of devices.

The process carried out by the device nodes is illustrated in the flowchart contained in FIG. 7. First, a discover frame is received from the CPU or SCPU, in step 7-1. In step 6-2, the node checks to see if an ID value has been previously set. Either way, in step 7-3, a response is sent to the CPU or SCPU. That response frame indicates whether the ID value has already been set for the node. The discover frame is forwarded to all ports of the node that have not previously received discovery frames when the ID value is set, as provided in step 7-4.

The system also responds to errors due to unreliable transport media. The forward discover pending flag is used to prevent discovers from being sent if the SCPU retransmits the ID Assign message because the SCPU did not receive the ID Assign Ack. In case the SCPU does not receive the response from the first device which sent the discover frame before the topology discovery timer expires, it flags an error to the higher layer management software and does not retransmit the discover.

In many chassis systems, hot swap of line cards or a redundant system management card is supported. A change in the device topology needs to be detected and the new topology re-learned. This will also be required in the case of stackable devices. Forwarding paths to devices will be reconfigured by the master SCPU if a device failure is detected. In this disclosure, a topology discovery mechanism for a network of managed devices has been described. The mechanism automates learning of topology in a network of managed devices. The mechanism sets up forwarding paths to each device in the network. The mechanism provides for resilience and fault tolerance to the management and control plane. The mechanism allows for ease of implementation of hot swap devices in switching systems as well as stackable systems.

The above-discussed configuration of the invention is, in one embodiment, embodied on a semiconductor substrate, such as silicon, with appropriate semiconductor manufacturing techniques and based upon a circuit layout which would, based upon the embodiments discussed above, be apparent to those skilled in the art. A person of skill in the art with respect to semiconductor design and manufacturing would be able to implement the various modules, interfaces, and components, etc. of the present invention onto a single semiconductor substrate, based upon the architectural description discussed above. It would also be within the scope of the invention to implement the disclosed elements of the invention in discrete electronic components, thereby taking advantage of the functional aspects of the invention without maximizing the advantages through the use of a single semiconductor substrate.

In addition, while the term packet has been used in the description of the present invention, the invention has import to many types of network data. For purposes of this invention, the term packet includes packet, cell, frame, datagram, bridge protocol data unit packet, and packet data.

Although the invention has been described based upon these preferred embodiments, it would be apparent to those of skilled in the art that certain modifications, variations, and alternative constructions would be apparent, while remaining within the spirit and scope of the invention. In order to determine the metes and bounds of the invention, therefore, reference should be made to the appended claims.

What is claimed is:

1. A process of discovering a topology of devices on a network, said process comprising:
    sending a discover frame having an identification list to nodes in communication with a central processing unit;
    awaiting a response frame from said nodes;
    processing said response frame to determine whether a node sending the response frame has an identification value;
    updating a routing table when the node has the identification value;
    sending an identification assign frame to the node when the node does not have the identification value; and
    awaiting an identification assign acknowledgement frame from the node when the node does not have the identification value.

2. A process as recited in claim 1, wherein said central processing unit comprises a system management central processing unit having a source device identifier and said step of sending a discover frame comprises sending a discover frame having said source device identifier included therein.

3. A process as recited in claim 1, wherein said step of sending a discover frame comprises sending a discover frame having number of hops field included therein indicating a number of nodes that the discover frame has passed through.

4. A process as recited in claim 3, wherein said step of sending a discover frame comprises starting a discovery timer when the discover frame is sent and the process further comprises stopping the process when the discovery timer reaches a predetermined value.

5. A process as recited in claim 4, wherein said step of processing said response frame comprises reviewing an explosion factor contained in the response frame, where the explosion factor is related to a number of ports on the node that have not received a separate discover message and the process further comprises changing said predetermined value based on the explosion factor.

6. A process as recited in claim 1, wherein said step of processing said response frame comprises reviewing an explosion factor contained in the response frame, where the explosion factor is related to a number of ports on the node that have not received a separate discover frame.

7. A process of discovering a topology of devices on a network, said process comprising:
    receiving a discover frame having an identification list by a node from a central processing unit;
    checking to see whether an identification value is set;
    sending a response to the central processing unit;
    forwarding the discover frame to all ports of the node that have not received a separate discovery frame when the identification value is set;
    comparing said identification value with frame identification values in the discovery frame; and
    dropping the discovery frame when said identification value matches one of the frame identification values in the discovery frame.

8. A process as recited in claim 7 further comprising updating a routing table with route information from the discover frame when the identification value is set.

9. A process as recited in claim 8, wherein said step of updating a routing table comprises:
    adding the route information to information in the routing table;

sorting all entries of the routing table according to number of nodes that are passed through to reach a destination; and setting as an active route an entry of the routing table having a smallest number of nodes that are passed through for said destination.

10. A process as recited in claim 7 further comprising, when the identification value is set:
    awaiting an identification assign frame from the central processing unit;
    sending an identification assign acknowledgement frame to the central processing unit;
    forwarding the discover frame to all ports of the node that have not received a separate discovery frame; and
    updating a routing table with route information from the discover frame.

11. A process as recited in claim 7, wherein said central processing unit comprises a system management central processing unit having a source device identifier and said step of receiving a discover frame comprises receiving a discover frame having said source device identifier included therein.

12. A mechanism for discovering a topology of devices on a network, said mechanism comprising:
    first sending means for sending a discover frame having an identification list to nodes in communication with a central processing unit;
    first waiting means for awaiting a response frame from said nodes;
    processing means for processing said response frame to determine whether a node sending the response frame has an identification value;
    updating means for updating a routing table when the node has the identification value;
    second sending means for sending an identification assign frame to the node when the node does not have the identification value; and
    second waiting means for awaiting an identification assign acknowledgement frame from the node when the node does not have the identification value.

13. A mechanism as recited in claim 12, wherein said central processing unit comprises a system management central processing unit having a source device identifier and said first sending means comprises third sending means for sending a discover frame having said source device identifier included therein.

14. A mechanism as recited in claim 12, wherein said first sending means comprises third sending means for sending a discover frame having number of hops field included therein indicating the number of nodes that the discover frame has passed through.

15. A mechanism as recited in claim 14, wherein said third sending means for sending a discover frame comprises starting means for starting a discovery timer when the discover frame is sent and the mechanism further comprises stopping means for stopping the process when the discovery timer reaches a predetermined value.

16. A mechanism as recited in claim 15, wherein said processing means comprises reviewing means for reviewing an explosion factor contained in the response frame, where the explosion factor is related to a number of ports on the node that have not received a separate discover message and the mechanism further comprises changing means for changing said predetermined value based on the explosion factor.

17. A mechanism as recited in claim 12, wherein said processing means comprises reviewing means for reviewing an explosion factor contained in the response frame, where the explosion factor is related to a number of ports on the node that have not received a separate discover frame.

18. A mechanism for discovering a topology of devices on a network, said mechanism comprising:
    receiving means for receiving a discover frame having an identification list by a node from a central processing unit;
    checking means for checking to see whether an identification value is set;
    sending means for sending a response to the central processing unit; and
    forwarding means for forwarding the discover frame to all ports of the node that have not received a separate discovery frame when the identification value is not set;
    comparing means for comparing said identification value with frame identification values in the discovery frame; and
    dropping means for dropping the discovery frame when said identification value matches one of the frame identification values in the discovery frame.

19. A mechanism as recited in claim 18 further comprising updating means for updating a routing table with route information from the discover frame when the identification value is set.

20. A mechanism as recited in claim 19, wherein said updating means comprises:
    adding means for adding the route information to information in the routing table;
    sorting means for sorting all entries of the routing table according to number of nodes that are passed through to reach a destination; and
    setting means for setting as an active route an entry of the routing table having a smallest number of nodes that are passed through for said destination.

21. A mechanism as recited in claim 18 further comprising, when the identification value is set:
    waiting means for awaiting an identification assign frame from the central processing unit;
    second sending means for sending an identification assign acknowledgement frame to the central processing unit;
    second forwarding means for forwarding the discover frame to all ports of the node that have not received a separate discovery frame; and
    updating means for updating a routing table with route information from the discover frame.

22. A mechanism as recited in claim 18, wherein said central processing unit comprises a system management central processing unit having a source device identifier and said receiving means comprises receiving means for receiving a discover frame having said source device identifier included therein.

23. A mechanism for discovering a topology of devices on a network, said mechanism comprising:
    a first sender, configured to send a discover frame having an identification list to nodes in communication with a central processing unit;
    a timer, configured to await a response frame from said nodes;
    a processor, configured to process said response frame to determine whether a node sending the response frame has an identification value;
    a memory interface, configured to update a routing table when the node has the identification value;
    a second sender, configured to send an identification assign frame to the node when the node does not have the identification value; and a acknowledgement timer, configured to await an identification assign acknowledgement frame from the node when the node does not have the identification value.

24. A mechanism as recited in claim 23, wherein said central processing unit comprises a system management central processing unit having a source device identifier and said first sender comprises a third sender configured to send a discover frame having said source device identifier included therein.

25. A mechanism as recited in claim 23, wherein said first sender comprises a third sender configured to send a discover frame having number of hops field included therein indicating the number of nodes that the discover frame has passed through.

26. A mechanism as recited in claim 25, wherein said third sender comprises a starter, configured to start the timer when the discover frame is sent and the mechanism further comprises an interrupter, configured to stop the discovery mechanism when the discovery timer reaches a predetermined value.

27. A mechanism as recited in claim 26, wherein said processor comprises a reviewer configured to review an explosion factor contained in the response frame, where the explosion factor is related to a number of ports on the node that have not received a separate discover message and the mechanism further comprises a timer reset configured to change said predetermined value based on the explosion factor.

28. A mechanism as recited in claim 23, wherein said processor comprises a reviewer configured to review an explosion factor contained in the response frame, where the explosion factor is related to a number of ports on the node that have not received a separate discover frame.

29. A mechanism for discovering a topology of devices on a network, said mechanism comprising:

a receiver, configured to receive a discover flame having an identification list by a node from a central processing unit;

a checker, configured to check to see whether an identification value is set;

a sender, configured to send a response to the central processing unit; and a transmitter, configured to forward the discover flame to all ports of the node that have not received a separate discovery flame when the identification value is not set;

a comparator, configured to compare said identification value with frame identification values in the discovery frame; and a deletion mechanism, configured to drop the discovery frame when said identification value matches one of the frame identification values in the discovery frame.

30. A mechanism as recited in claim 29 further comprising an updater configured to update a routing table with route information from the discover frame when the identification value is set.

31. A mechanism as recited in claim 30, wherein said updater comprises:

an adder, configured to add the route information to information in the routing table;

a sorter, configured to sort all entries of the routing table according to number of nodes that are passed through to reach a destination; and a setter, configured to set as an active route an entry of the routing table having a smallest number of nodes that are passed through for said destination.

32. A mechanism as recited in claim 29 further comprising:

a timer, configured to await an identification assign frame from the central processing unit;

a second sender configured to send an identification assign acknowledgement frame to the central processing unit;

a transmitter, configured to forward the discover frame to all ports of the node that have not received a separate discovery frame; and an updater, configured to update a routing table with route information from the discover frame.

33. A mechanism as recited in claim 29, wherein said central processing unit comprises a system management central processing unit having a source device identifier and said receiver comprises a receiver configured to receive a discover frame having said source device identifier included therein.

* * * * *